United States Patent [19]

Pullen et al.

[11] 3,919,403

[45] Nov. 11, 1975

[54] METHOD FOR THE PRODUCTION OF ALPHA ALUMINA MONOHYDRATE

[75] Inventors: Joseph B. Pullen, Annandale, Va.; Burton L. Mobley, Ellicott City, Md.

[73] Assignee: W. R. Grace & Co., New York, N.Y.

[22] Filed: July 17, 1972

[21] Appl. No.: 272,286

[52] U.S. Cl. .............. 423/628; 423/556; 423/630; 423/631
[51] Int. Cl.$^2$ .......................................... C01F 7/02
[58] Field of Search .......... 423/625, 628, 629, 630, 423/631, 556, 127, 128

[56] References Cited
UNITED STATES PATENTS

| | | | |
|---|---|---|---|
| 3,027,233 | 3/1962 | Michalko | 423/630 |
| 3,169,827 | 2/1965 | deRosset | 423/631 |
| 3,169,931 | 2/1965 | deRosset et al. | 423/628 X |
| 3,193,349 | 7/1965 | Mooi | 423/630 |
| 3,325,247 | 6/1967 | Magee et al. | 423/628 |

OTHER PUBLICATIONS

Gordon et al., "Precipitation from Homogeneous Solution," 1959, pp. 13-19, John Wiley & Sons, Inc., N.Y. N.Y.

Willard, "Separation by Precipitation from Homogeneous Solution," Analytical Chemistry, Volume 22, No. 11, November 1950, pp. 1372-1374.

Willard et al., "A Study of the Precipitation of Aluminum Basic Sulfate by Urea," J.A.C.S., Vol. 50, 1937, pp. 1190-1196.

*Primary Examiner*—Oscar R. Vertiz
*Assistant Examiner*—Brian E. Hearn
*Attorney, Agent, or Firm*—Michael J. McGreal; Kenneth E. Prince

[57] ABSTRACT

Basic aluminum sulfate can be homogeneously precipitated from an aluminum sulfate solution by the in situ decomposition of an ammonia yielding compound within the aluminum sulfate solution. The preferred ammonia yielding compounds are urea, thiourea, biuret, guanidine and salts and derivatives thereof. Ammonium hydroxide, sodium hydroxide, potassium hydroxide or sodium aluminate is then added to the basic aluminum sulfate to yield an alpha alumina monohydrate of unique pore and extrusion characteristics.

4 Claims, No Drawings

METHOD FOR THE PRODUCTION OF ALPHA ALUMINA MONOHYDRATE

This invention relates to a new and improved method for producing alpha alumina monohydrate. More specifically, this invention comprises a technique for homogeneously precipitating a basic aluminum sulfate and the subsequent conversion of the basic aluminum sulfate to alpha alumina monohydrate.

The conventional method for producing basic aluminum sulfate comprises the addition of ammonia or ammonium hydroxide to an aqueous solution of aluminum sulfate, in order to precipitate the basic aluminum sulfate. This process has the disadvantage in that on addition of the ammonia or ammonium hydroxide to the aluminum sulfate, there is an immediate and inhomogeneous precipitation of the basic aluminum sulfate. That is, the basic aluminum sulfate is precipitated as the ammonia or ammonium hydroxide is added. After formation of a basic aluminum sulfate, additional base is added in the form of sodium hydroxide, potassium hydroxide, ammonium hydroxide or sodium hydroxide, in order to convert the basic aluminum sulfate to alpha alumina monohydrate.

It has now been found that an alpha alumina monohydrate of very distinct and different characteristics can be formed if the precursor basic aluminum sulfate is homogeneously precipitated from the aluminum sulfate solution. The alpha alumina monohydrates produced by this process have unique pore characteristics, and are significantly more easily extrudable. The technique of homogeneous precipitation of basic aluminum sulfate from an aluminum sulfate solution consists in admixing an ammonia yielding compound with the aluminum sulfate solution. By ammonia yielding compound is meant a compound which, on heating of this solution, will gradually evolve ammonia, which then reacts with the aluminum sulfate to precipitate a basic aluminum sulfate. The preferred ammonia yielding compounds of this invention are urea, thiourea, biuret, guanidine and their salts. After formation of this homogeneously precipitated basic aluminum sulfate, either ammonium hydroxide, sodium hydroxide, potassium hydroxide or sodium aluminate is added to convert this homogeneous basic aluminum sulfate to alpha alumina monohydrate.

The reason for this phenomenon of an alumina with differing characteristics if the precursor basic aluminum sulfate is homogeneously precipitated, is not known. It can only be theorized that when ammonium hydroxide is the reagent which is added to the aluminum sulfate solution to precipitate the basic aluminum sulfate, there are local centers of super saturation or overconcentration, thereby yielding a precipitate with different characteristics. It has been found that even extreme or intense agitation does not overcome this effect of a local super saturation. The present invention, which consists in the addition of an ammonia yielding compound, solves these problems of local super saturation. The ammonia yielding compound is added to the aluminum sulfate solution, either as the ammonia compound or as an aqueous solution of the ammonia yielding compound, and is thoroughly admixed into the aluminum sulfate solution. After being admixed, this aluminum sulfate solution is heated to a temperature sufficient to decompose the ammonia yielding compound so as to have ammonia evolved throughout the aluminum sulfate solution. That is, ammonium ions are being constantly formed homogeneously throughout the aluminum sulfate solution. This then causes the formation of a homogeneous basic aluminum sulfate precipitate.

It is a prime object of this invention to set a new technique for forming basic aluminum sulfate. This basic aluminum sulfate is then converted to a unique form of alpha alumina monohydrate.

Another prime object of this invention is to homogeneously precipitate basic aluminum sulfate by admixing an ammonia yielding compound with aluminum sulfate solution, and thereafter heating this mixture to above the temperature for the decomposition of the ammonia yielding compound and thereby homogeneously precipitating basic aluminum sulfate.

In more detail, this process consists in first forming an aluminum sulfate solution. The aluminum sulfate solution is formed by the dissolution of alum in water or the reaction of sulfuric acid and alumina trihydrate. The concentration of aluminum sulfate in this solution may range from about 5 percent to about 30 percent by weight. After formation of the alum solution, a portion of ammonia may be added to raise the pH to about 2.7 to 3.5. This ammonia may be added as gaseous ammonia or as an ammonium hydroxide solution. This addition of ammonium precipitates little, if any, basic aluminum sulfate, but it raises the pH up to this level, and preferably to about 3.2. The reason for adding ammonia is that the amount of ammonia yielding compound which is to be subsequently added is significantly decreased. If desired, ammonia need not be added and an increased amount of ammonia yielding compound will then have to be added. In a next step of this process, a sufficient amount of an ammonia yielding compound is added so as to be sufficient to raise the pH to about 4.5 to about 6.0 upon decomposition of this compound. This ammonia yielding compound is then admixed into the aluminum sulfate solution. This admixed solution is heated at from about 175° to about 300°F for about from 4 to 12 hours. During this heating, the ammonia yielding compound decomposes, homogeneously evolving ammonia throughout the solution, causing a basic aluminum sulfate to be precipitated. During this heating, the pH of the solution rises to about 4.5 to about 6.0.

After precipitation of this basic aluminum sulfate is complete, a solution of either ammonium hydroxide, sodium hydroxide, potassium hydroxide or sodium aluminate is added so as to convert this basic aluminum sulfate to alpha alumina monohydrate. A sufficient amount of this base is added to increase the pH to about 9.0 to about 10.5. At this pH of about 9.0 to about 10.5, the conversion of the basic aluminum sulfate to alpha aluminum monohydrate is complete. This conversion takes from about 15 minutes to about 5 hours. Optionally, the mixture may be heated during this conversion of the basic aluminum sulfate to alpha alumina monohydrate. If heating is used, this may very usefully be in the range of 100°F to 220°F. When temperatures of greater than about 212°F are used, pressure equipment will be necessary. The alpha alumina monohydrate is then washed and dried. A convenient drying technique is by spray drying. Inlet gas feed to the spray dryer is air at about 600° to 1200°F, with an outlet temperature of 225°F to 350°F.

The unique feature of this process is the homogeneous precipitation of basic aluminum sulfate. This homogeneous precipitation is not possible via a mixing technique, no matter how vigorous a mixing is used. This homogeneous precipitation can only be effected by the in situ decomposition of an ammonia yielding compound in the aluminum sulfate solution. This in situ decomposition provides an ammonium concentration equivalent throughout the aluminum sulfate solution. In regard to this ammonia yielding compound, essentially any ammonia containing and yielding compound can be used, as long as a decomposition product, on heating, is ammonia. The preferred compounds are urea, thiourea, biuret and guanidine, along with their salts and derivatives, which yield ammonia on decomposition. What is included in this designation are the various salts such as the halides, phosphates, carbonates, sulfates and nitrates, and various organic derivatives which decompose to evolve ammonia.

The product produced by these methods consists solely of $\alpha$ alumina monohydrate as determined by x-ray analysis. Pore volumes are in the range of .65 to .80 cc/g, with surface areas in the range of 200 to 300 m$^2$/g. Average pore diameters are in the range of 95 to 125 angstroms.

The following examples set forth are the best mode for practicing the present invention.

EXAMPLE 1

454 g. of aluminum sulfate is dissolved in 992 g of water and heated to about 170°F. The pH is about 2.1. Aqueous ammonia (10 percent solution) is added to raise the pH to about 3.0–3.3., giving a very slight opalescence due to precipitated basic aluminum sulfate. 80 g. of urea is added (slight stoichiometric excess) and the solution heated near the boiling point, precipitating the aluminum as the basic sulfate. When the clear supernatant liquid gives a negative Al test (by adding NH$_4$OH to a filtered sample and observing for a white precipitate of alumina), heating is discontinued and aqueous ammonia (10 percent solution) is added to raise the pH to about 9, converting the basic aluminum sulfate to $\alpha$ Al$_2$O$_3$·H$_2$O. The precipitated $\alpha$alumina monohydrate is filtered, washed with water, reslurried in water and dried at 200°C. The product is 100 percent $\alpha$ alumina monohydrate having an average pore volume of .71, an average pore diameter of 113 and a surface area of 234 m$^2$/g.

EXAMPLE 2

454 g. of aluminum sulfate (alum) is admixed with 2500 g. of water and heated to 210°F until solution is complete. 110 cc of 28 percent NH$_3$ is admixed with 500 cc of water and added to the aluminum sulfate solution. After this addition, the pH is about 3.0. Fifty grams of urea is then added, and the mixture boiled for 11 hours. A precipitate of basic aluminum sulfate forms. The pH is 5.0. Five hundred milliliters of sodium aluminate containing 226 of alumina is added with mixing, with the pH rising to 10. This mixture is boiled for 2 hours and allowed to cool. The product is then filtered and washed with a 2 percent ammonium carbonate solution.

The product is 100 percent $\alpha$alumina monohydrate, having a surface area of 284 m$^2$/g, pore volume of 0.68 cc/g, pore diameter of 96A, crystallite size of 48A and density of 8.3 lbs/cu ft.

EXAMPLE 3

300 gallons of city water was added to a 400-gallon steam-jacketed, stainless steel vessel, and heated to 205°F. 450 pounds of alum (aluminum sulfate, 17% Al$_2$O$_3$) was added, and aqueous ammonia was added to produce a pH of 3.2. 60 pounds of urea was then added. This solution was heated at 200°–210°F for about 8 hours, during which all aluminum precipitated as the basic sulfate and the pH rose to 5.3. Sodium aluminate solution (Na$_2$O:Al$_2$O$_3$ of 1.36:1) was added (116 gallons at 120°F) over a period of one hour to a pH of about 10.0. The slurry was filtered on a continuous belt filter having about three square feet of filtration surface. The filter cake was washed on the filter with hot 2 percent ammonium carbonate solution and reslurried in 300 gallons of the same solution. The cake was filtered again and reslurried in the same manner; filtered and washed a third time, reslurried in water and spray dried. The analysis of the product was as follows:

| | | |
|---|---|---|
| Surface Area | (Activated 3 hrs. at 1000°F) | 236 sq.m/gm. |
| Pore Volume | (Activated 3 hrs. at 1000°F) | 0.79 cc/gm. |
| Packed Density | (Activated 3 hrs. at 1000°F) | 20 lbs/cuft |
| X-ray analysis showed only $\alpha$Al$_2$O$_3$.H$_2$O | | |

EXAMPLE 4

The procedure of Example 2 was repeated, except that a 10 percent caustic solution was used to raise the pH to 10 in the conversion of the basic aluminum sulfate to $\alpha$ alumina monohydrate. The $\alpha$ alumina monohydrate was then filtered and washed three times, using a 2 percent ammonium carbonate solution. The washed $\alpha$ alumina monohydrate was dried in a spray dryer using an air inlet feed at 850°F. This $\alpha$ alumina monohydrate had a pore volume of 0.71 cc/g, surface area of 214 m$^2$/g, pore diameter of 110A and a density of 17.6 lbs/cu. ft.

What is claimed is:

1. A process for producing alpha alumina monohydrate having a pore volume of 0.65 to 0.85 c.c./g., a pore diameter of 95 to 125 Angstroms and a surface area of 200 to 300 m$^2$/g. comprising:
   forming an aqueous solution of aluminum sulfate;
   adding ammonia to raise the pH of said aluminum sulfate solution to about 2.7 to 3.5;
   admixing a compound which will yield ammonia on thermal decomposition in an amount sufficient to raise the admixture to a pH of about 4.5 to 6.0 after decomposition of said compound;
   heating said admixture to thermally decompose said ammonia yielding compound and homogeneously precipitating basic aluminum sulfate;
   adding a basic compound selected from the group consisting of sodium hydroxide, potassium hydroxide, ammonium hydroxide or sodium aluminate to said admixture, thereby increasing the pH to about 9.0 to 10.5 and forming alpha alumina monohydrate; and
   recovering said alpha alumina monohydrate.

2. A process as in claim 1 wherein said ammonia yielding compound is selected from the group consisting of urea, thiourea, biuret, guanidine and salts and derivatives thereof.

3. A process as in claim 2 wherein said aluminum sulfate solution contains from about 5 percent to about 30 percent aluminum sulfate by weight.

4. A process as in claim 3 wherein the ammonia yielding compound is urea.

* * * * *